(12) United States Patent
Yanai

(10) Patent No.: US 8,436,922 B2
(45) Date of Patent: May 7, 2013

(54) IMAGE PICKUP APPARATUS AND METHOD FOR CONTROLLING THE SAME

(75) Inventor: Toshikazu Yanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 12/943,873

(22) Filed: Nov. 10, 2010

(65) Prior Publication Data

US 2011/0115956 A1     May 19, 2011

(30) Foreign Application Priority Data

Nov. 16, 2009   (WO) .................. PCT/JP2009/069456

(51) Int. Cl.
*H04N 5/217* (2011.01)
*H04N 9/64* (2006.01)

(52) U.S. Cl.
USPC .......................................... 348/241; 348/248

(58) Field of Classification Search .................. 348/241, 348/248, 296, 30–310.6; 250/208.1; 257/229–290, 257/292
See application file for complete search history.

(56) References Cited

U.S. PATENT DOCUMENTS

| | | | | |
|---|---|---|---|---|
| 7,656,457 B2 * | 2/2010 | Ojima et al. | ................... | 348/362 |
| 7,880,783 B2 * | 2/2011 | Irie | ................... | 348/248 |
| 2002/0167603 A1 * | 11/2002 | Kato et al. | ................... | 348/341 |
| 2004/0207746 A1 | 10/2004 | Endo et al. | | |
| 2004/0212723 A1 * | 10/2004 | Lin | ................... | 348/362 |
| 2005/0128324 A1 | 6/2005 | Kishi et al. | | |
| 2006/0157760 A1 | 7/2006 | Hayashi et al. | | |
| 2008/0231968 A1 * | 9/2008 | Souma | ................... | 359/686 |

FOREIGN PATENT DOCUMENTS

| | | |
|---|---|---|
| JP | 2004-317943 A | 11/2004 |
| JP | 2005-176105 A | 6/2005 |
| JP | 2006-191236 A | 7/2006 |
| JP | 2007-028167 A | 2/2007 |

\* cited by examiner

*Primary Examiner* — Trung Diep
(74) *Attorney, Agent, or Firm* — Carter, DeLuca, Farrell & Schmidt LLP

(57) ABSTRACT

An image pickup apparatus which prevents distortion of an image captured using an image pickup element employing an XY reading method and which suppresses degradation of the captured image caused by light leakage to pixel circuits is provided. Transfer transistors and reset transistors in all rows are turned on and photodiodes and FDs are reset before exposure of the photodiodes is started. Then, after a predetermined exposure time has been elapsed, the transfer transistors in all the rows are turned on and signal charges of the photodiodes of all pixels are transmitted to the FDs. When the exposure is terminated, a mechanical shutter is closed so as to block leakage light, and voltages corresponding to the signal charges transmitted from the photodiodes are successively read from the FDs on a row-by-row basis.

6 Claims, 8 Drawing Sheets

IMAGE PICKUP APPARATUS AND METHOD FOR CONTROLLING THE SAME

TECHNICAL FIELD

The present invention relates to image pickup apparatuses which capture images using image pickup elements and methods for controlling the same. The present invention particularly relates to an image pickup apparatus which captures images using an image pickup element such as a CMOS image sensor which reads pixel signals in an XY address method and a method for controlling the same.

BACKGROUND ART

In recent years, image pickup apparatuses such as digital still cameras and digital video cameras which capture images using image pickup elements and store the captured images as digital data have been widely used. CCD (Charge Coupled Device) image sensors have been commonly used as image pickup elements included in such image pickup apparatuses. However, as the number of pixels included in the image pickup element is further increased, CMOS (Complementary Metal Oxide Semiconductor) image sensors have attracted more attention. When compared with CCD image sensors, CMOS image sensors are characterized by random access of pixel signals, higher reading speed, high sensibility, and low power consumption.

Regardless of whether a CMOS sensor or a CCD sensor is used in an image pickup apparatus, when a mechanical shutter is used to control an exposure time, variation of the exposure time occurs due to a variation error of positional accuracy which occurs at a time of assembly or a variation error of accuracy of operations of shutter blades. In particular, when a high-speed shutter is used, a percentage of an error in the exposure time is large.

On the other hand, most image pickup elements have electronic shutter functions. In such an electronic shutter function, pixels of an image pickup element are reset before exposure is started, and signals of the pixels of the image pickup element are read before the exposure is terminated. In this manner, since the start of the exposure and the end of the exposure are controlled only using a function of the image pickup element, reliable control of the exposure time of a low-speed shutter and a high-speed shutter can be realized.

However, an electronic shutter function of the CMOS image sensors is different from that of the CCD image sensors in that a number of pixels arranged in a matrix are successively scanned for each pixel row so that signals are read. Accordingly, in a CMOS sensor, the exposure time is varied according to rows (refer to FIG. 9 of Patent Literature 1). Therefore, there arises a problem in that, as shown in FIG. 9(B) of Patent Literature 1, when an object S which linearly extends in a vertical direction moves in a horizontal direction while the object S is captured, the object S is tilted in a still image. Such an electronic shutter function of the CMOS image sensors is referred to as a "rolling shutter" or a "focal plain shutter".

On the other hand, CMOS image sensors in which a shutter is simultaneously released for all rows so that an identical exposure time is obtained have been proposed (refer to FIG. 11 of Patent Literature 1, for example). In such a CMOS image sensor, photodiodes in all the rows are simultaneously reset at a certain time, and after a predetermined exposure time has elapsed, charges of the photodiodes of all the rows are simultaneously transmitted to floating diffusions (FDs). Then, signals transmitted to the FDs are output on a row-by-row basis. In this manner, as shown in FIG. 11(B) of Patent Literature 1, even when the object S which linearly extends in the vertical direction moves in the horizontal direction, the object is not tilted in the captured still image.

Citation List

Patent Literature

PTL 1 Japanese Patent Laid-Open No. 2006-191236
PTL 2 Japanese Patent Laid-Open No. 2005-176105

However, in pixels (FIG. 10 of Patent Literature 1) of the CMOS image sensor which realizes FIG. 11 of Patent Literature 1, it is difficult to totally block light to be incident on components other than light incident on the photodiodes. That is, by the time the signals of a row of FDs are output, light is leaked to adjacent rows of FDs, and therefore, an amount of light leakage in a preceding row from which signals are output is different from an amount of light leakage in a succeeding row from which signals are output. Therefore, there arises a problem in that a difference among the amounts of light leakage is generated and degradation of a captured image occurs.

In order to address the difference among the amounts of light leakage, an image pickup apparatus which controls resetting of photodiodes and transmission to FDs so that the resetting of the photodiodes and the transmission to the FDs are in synchronization with a light-shielding operation of a mechanical shutter by making a reading direction in a unit of row of a CMOS image sensor equal to a light-shielding direction of the mechanical shutter has been proposed (refer to Patent Literature 2, for example). As shown in FIG. 3 of Patent Literature 2, periods of time from when the signals are transmitted to the FDs to when the mechanical shutter performs light shielding for all the rows become the same as one another, and therefore, the problem of the difference among the amounts of light leakage appears to be solved.

However, as shown in FIG. 3 of Patent Literature 2, since the resetting of the photodiodes and the transmission of the signals to the FDs for all the rows are not simultaneously performed, a moving object is captured in a tilted state.

The present invention has been made in view of the above problems, and an object of the present invention is to provide an image pickup apparatus capable of preventing distortion of images captured by an image pickup element which employs an XY reading method and capable of suppressing degradation of captured images caused by leakage of light to pixels.

SUMMARY OF INVENTION

In order to attain the object described above, the present invention provides an image pickup apparatus including an image pickup element including a matrix of pixels, each of the pixels including photoelectric conversion means for generating a charge in accordance with a quantity of incident light through photoelectric conversion, storage means for storing the charge generated by the photoelectric conversion means, transfer means for transferring the charge from the photoelectric conversion means to the storage means, and reset means for resetting the storage means, an optical lens barrel configured to form an object image on the image pickup element and which includes a first lens unit having at least one lens, a second lens unit which includes at least one lens having an optical axis the same as that of the first lens unit and which is located between the first lens unit and the image pickup element, light-shielding means which is located in the vicinity of the second lens unit and which blocks light to be incident on the image pickup element, and control means for performing control such that the photoelectric conversion means starts the photoelectric conversion by turning off the transfer means after the photoelectric conversion means and the storage means included in all rows of the image pickup element are simultaneously reset by turning on the reset means and the transfer means included in all the rows, the light-shielding means is operated after the photoelectric conversion means transmits the charge to the storage means by simultaneously turning on the transfer means in all the rows after a set exposure time has been elapsed so as to block light to be incident on the photoelectric conversion means, and thereafter, voltages corresponding to charges stored in the storage means are successively read on a row-by-row basis.

Furthermore, the present invention provides a method for controlling an image pickup apparatus including an image pickup element including a plurality of pixels arranged in a matrix, each of the pixels including photoelectric conversion means for generating a charge in accordance with a quantity of incident light through photoelectric conversion, storage means for storing the charge generated by the photoelectric conversion means, transfer means for transferring the charge from the photoelectric conversion means to the storage means, and reset means for resetting the storage means, and an optical lens barrel which is used to form an object image on the image pickup element and which includes a first lens unit having at least one lens, a second lens unit which includes at least one lens having an optical axis the same as that of the first lens unit and which is located between the first lens unit and the image pickup element, light-shielding means which is located in the vicinity of the second lens unit and which blocks light to be incident on the image pickup element. In the control method, control is performed such that the photoelectric conversion means starts the photoelectric conversion by turning off the transfer means after the photoelectric conversion means and the storage means included in all rows of the image pickup element are simultaneously reset by turning on the reset means and the transfer means included in all the rows, the light-shielding means is operated after the photoelectric conversion means transmits the charge to the storage means by simultaneously turning on the transfer means in all the rows after a set exposure time has been elapsed so as to block light to be incident on the photoelectric conversion means, and thereafter, voltages corresponding to charges stored in the storage means are successively read on a row-by-row basis.

Further features of the present invention will become apparent to persons having ordinary skill in the art from the following description of exemplary embodiments with reference to the attached drawings.

DESCRIPTION OF EMBODIMENTS

Embodiments of the present invention will be described hereinafter with reference to the accompanying drawings. Note that the embodiments described below are merely examples serving as means for realizing the present invention, and modifications or variations may be made where appropriate depending on a configuration of an apparatus to which the present invention is applied or various other conditions. Accordingly, the present invention is not limited to the embodiments described below.

First Embodiment

Figure 1:
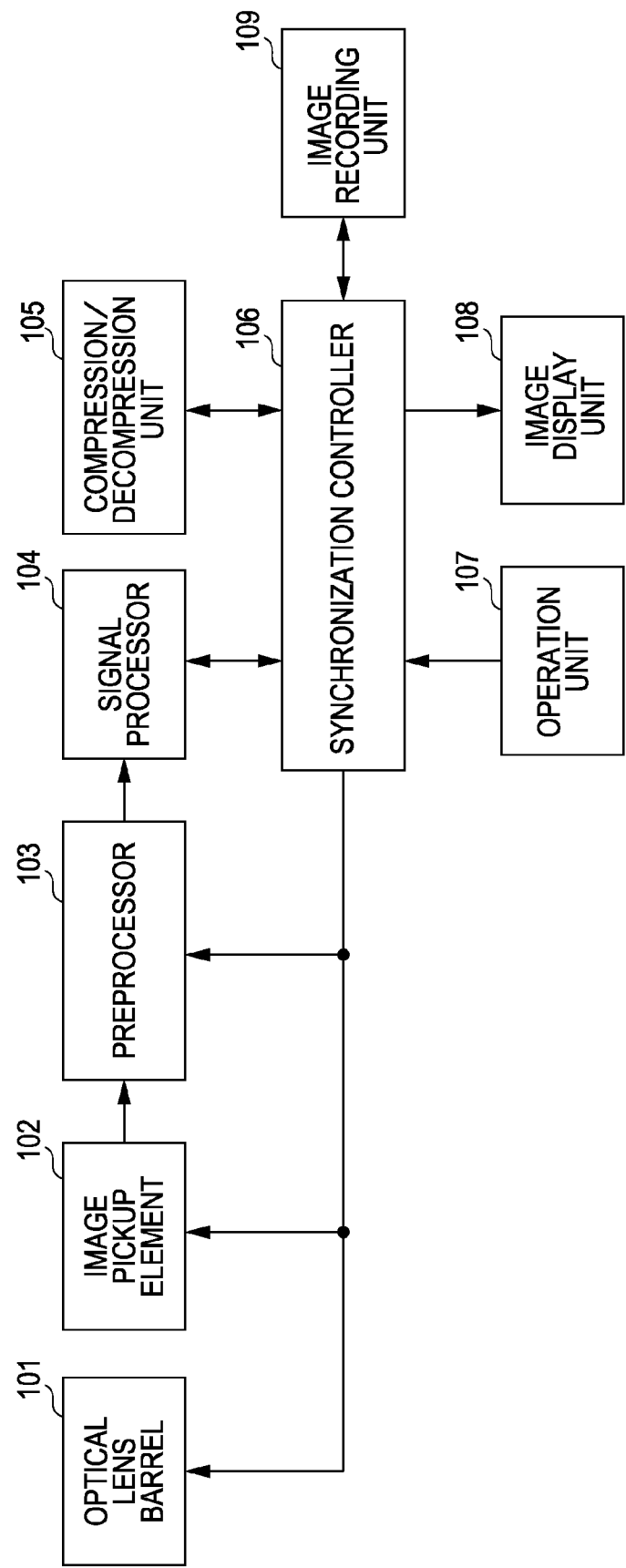
FIG. 1 is a diagram illustrating a configuration of an image pickup apparatus according to an embodiment.

Referring to FIGS. 1 to 9, a first embodiment of the present invention will be described. FIG. 1 is a diagram illustrating a configuration of an image pickup apparatus of this embodiment. The image pickup apparatus of this embodiment is applicable to electronic still cameras and video cameras which have a moving-image function.

The image pickup apparatus shown in FIG. 1 includes an optical lens barrel 101, an image pickup element 102, a preprocessor 103, a signal processor 104, a compression/decompression unit 105, a synchronization controller 106, an operation unit 107, an image display unit 108, and an image recording unit 109. The optical lens barrel 101 includes a lens which focuses light from an object into the image pickup element 102, a driving mechanism which moves the lens for a zooming operation and a focusing operation, a mechanical shutter mechanism, and an aperture mechanism. Among these components, movable units are driven in accordance with control signals supplied from the synchronization controller 106.

The image pickup element 102 is a CMOS image sensor employing an XY reading method, for example, and controls a timing of exposure, a timing of reading of a signal, a timing of resetting, and the like in accordance with control signals supplied from the synchronization controller 106 (control means). The preprocessor 103 includes a CDS (Correlated Double Sampling) circuit, an AGC (Auto Gain Control) circuit, and an AD convertor circuit, and operates under control of the synchronization controller 106. The CDS circuit performs a CDS process on signals output from the image pickup element 102 so as to remove fixed pattern noise caused by variation of threshold values of transistors included in pixel circuits and performs sample and hold so that an excellent S/N (Signal/Noise) ratio is maintained. Furthermore, the AGC circuit performs an AGC process so as to control a gain, and the AD convertor circuit converts analog image signals supplied from the CDS circuit and the AGC circuit into digital image signals.

The signal processor 104 performs signal processes such as a white balance control process, a color correction process, an AF (Auto Focus) process, and an AE (Auto Exposure) process on image signals which have been digitalized by the preprocessor 103 under control of the synchronization controller 106. The compression/decompression unit 105 operates under control of the synchronization controller 106 and performs a compression encoding process on the image signals supplied from the signal processor 104 in a predetermined data format for still images such as a JPEG (Joint Photographic Coding Experts Group) method. Furthermore, the compression/decompression unit 105 performs a decompression decoding process on encoded still image data supplied from the synchronization controller 106. Moreover, the compression/decompression unit 105 may be capable of performing the compression encoding process and the decompression decoding process on moving images by an MPEG (Moving Picture Experts Group) method, for example.

The synchronization controller 106 includes, for example, a CPU (Central Processing Unit), a ROM (Read Only Memory), a RAM (Random Access Memory), and the like and integrally controls the units of the image pickup apparatus by executing programs stored in the ROM or the like. The operation unit 107 includes various operation keys including a shutter release button, a lever, a dial, and the like, and supplies a control signal to the synchronization controller 106 in response to an input operation performed by a user. The image display unit 108 includes a display device such as an LCD (Liquid Crystal Display), an interface circuit for the display device, and the like. The image display unit 108 converts an image signal supplied from the synchronization controller 106 into a video signal for display and supplies the video signal to the display device which displays an image. The image recording unit 109 receives an image data file which has been encoded by the compression/decompression unit 105 from the synchronization controller 106 and records the image data file in a portable semiconductor memory, an optical disc, an HDD (Hard Disk Drive), a magnetic tale, or the like. Furthermore, the image recording unit 109 reads data specified in accordance with a control signal supplied from the synchronization controller 106 from the recording medium and outputs the data to the synchronization controller 106.

Here, basic operation of such an image pickup apparatus will be described. Image signals output from the image pickup element 102 are successively supplied to the preprocessor 103 where the CDS process and the AGC process are performed on the image signals and the AD converter converts the image signals into digital image signals. The signal processor 104 performs an image-quality correction process on the digital image signals supplied from the preprocessor 103 and supplies the digital image signals as camera-through image signals to the image display unit 108 through the synchronization controller 106. The image display unit 108 displays a camera-through image and a user adjusts an angle of field while viewing the displayed image.

In a case where a still image is to be captured and recorded, when the shutter release button included in the operation unit 107 is pressed, image-pickup signals for one frame are supplied from the image pickup element 102 to the signal processor 104 through the preprocessor 103 under control of the synchronization controller 106. The signal processor 104 performs an image quality correction process on the supplied image signals for one frame and supplies the processed image signals to the compression/decompression unit 105. The compression/decompression unit 105 performs compression and encoding on the supplied image signals and supplies resultant encoded data to the image recording unit 109 through the synchronization controller 106. Then, in the image recording unit 109, data file corresponding to the captured still image is stored in the recording medium.

When the still image is to be reproduced, in response to an operation input supplied from the operation unit 107, the synchronization controller 106 reads a selected data file from the recording medium of the image recording unit 109 and supplies the read data file to the compression/decompression unit 105 which performs the decompression/decoding process. The decoded image signals are supplied to the image display unit 108 through the synchronization controller 106, and then, the still image is reproduced and displayed.

Furthermore, in a case where a moving image is to be captured and recorded, when the shutter release button included in the operation unit 107 is pressed, image-pickup signals for consecutive frames are supplied from the image pickup element 102 to the signal processor 104 through the preprocessor 103. The signal processor 104 successively processes the supplied image signals for consecutive frames and supplies the image signals to the compression/decompression unit 105. The compression/decompression unit 105 performs the compression/encoding process on the supplied image signals so as to generate encoding data of the moving image, and successively supplies the encoding data to the image recording unit 109.

When the moving image is to be reproduced, in response to an operation input supplied from the operation unit 107, the synchronization controller 106 reads a selected data file from the recording medium included in the image recording unit 109 and supplies the data file to the compression/decompression unit 105 which performs the decompression/decoding process. The decoded image signals are supplied to the image display unit 108 through the synchronization controller 106 which reproduces and displays the moving image.

Figure 2:
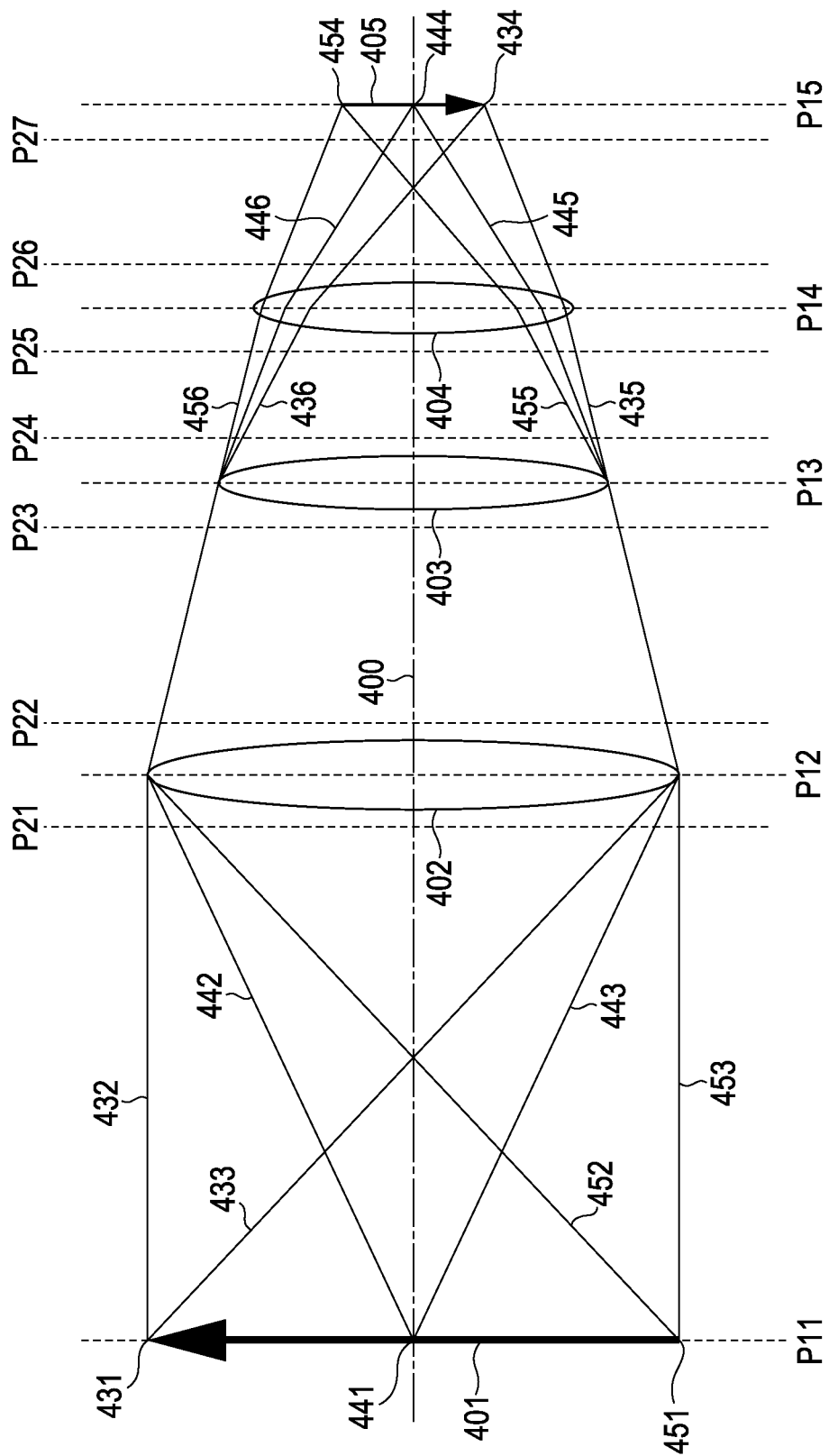
FIG. 2 is a diagram schematically illustrating a function of an optical lens barrel.

FIG. 2 is a diagram schematically illustrating a function of the optical lens barrel 101 including three lens groups. With respect to an optical axis 400, an object 401 is located in a position P11, a first lens group 402 (first lens unit) is located in a position P12, a second lens group 403 (second lens unit) is located in a position P13, and a third lens group 404 (third lens unit) is located in a position P14. Then, an object image 405 is formed on an image-forming plane in a position P15. Here, it is assumed that each of the first lens group 402, the second lens group 403, and the third lens group 404 includes at least one lens. When each of the lens groups includes a plurality of lenses, although the positional relationship among the lenses in the same lens group is fixed, the relative positional relationship among the lens groups are changed due to the zooming operation or the focusing operation.

Furthermore, an image pickup region of the image pickup element 102 is located in the image-forming plane P15.

A region defined by solid lines 432 and 433 represents a range of a light flux emitted from an object upper edge 431 to the first lens group 402, and a region defined by solid lines 442 and 443 represents a range of a light flux emitted from an object center 441 to the first lens group 402. Furthermore, a region defined by solid lines 452 and 453 represents a range of a light flux emitted from an object lower edge 451 to the first lens group 402.

A region defined by solid lines 435 and 436 represents a range of a light flux which passed through the second lens group 403 and which forms an image on an object-image upper end 434. A region defined by solid lines 445 and 446 represents a range of a light flux which passed through the second lens group 403 and which forms an image on an object-image center 444. Furthermore, a range defined by solid lines 455 and 456 represents a range of a light flux which passed through the second lens group 403 and which forms an image on an object-image lower end 454.

In such a relationship of the lenses, the zooming function is realized using the first and second lens groups 402 and 403 in many cases. For example, the first lens group 402 may perform a magnification function and the second lens group 403 may perform a function of correcting a position of a forming image. Then, since the third lens group 404 is located nearest the image forming plane and generally has a lens of a small diameter in many cases, the third lens group 404 has a focusing function which requires excellent positional accuracy and excellent movement speed in many cases. Furthermore, an aperture (light-quantity control means for controlling a quantity of light which is incident on the image pickup element) may be disposed between the first and second lens groups 402 and 403, although not shown in FIG. 2.

Next, a case where a mechanical shutter (means for blocking light which encounters the image pickup element) is arranged in one of positions P21 and P27 relative to the optical axis 400 will be described. Note that the mechanical shutter described herein corresponds to a lens shutter in which shutter blades are closed from an outside toward the optical axis. When the mechanical shutter is located in the position P27 and when the shutter blades start closing, the shutter blocks part of the light fluxes of the object upper end and the object lower end. However, the light flux of the center is not blocked. Therefore, a difference between an exposure time of an outer portion and an exposure time of a center portion becomes large, and accordingly, uneven exposure is generated in an object image.

When the mechanical shutter is located in one of the positions P24 to P26, a difference between the exposure time of the outer portion and the exposure time of the center portion is generated; this exposure time difference is smaller than that in the case where the mechanical shutter is located in the position P27. Degrees of uneven exposure degrades from the position P24 to the position P26, and the position P26 may be inappropriate since the position P26 is located near the image-forming plane relative to the focus lens.

When the mechanical shutter is located in the position P22 or the position P23, the mechanical shutter is located between the first and second lens groups 402 and 403 which are included in the zoom lens. This position corresponds to a pupil plane (Fourier transform plane) and the light emitted from the object is converted into a spatial frequency, and accordingly, the aperture of the lens can be simultaneously stopped down for the light fluxes emitted from the object. Therefore, the aperture is located in this position. The mechanical shutter is preferably located in this position so that the light-shielding is performed without generating uneven exposure in an object image.

When the mechanical shutter is located in the position P21, the difference between the exposure time of the outer portion of the object image and the exposure time of the center portion is generated. Furthermore, when the lens located nearest the object has the largest diameter in many cases, and therefore, it is not appropriate that the mechanical shutter is located such a position. Note that the positions P21 to P26 are located immediately before or immediately after one of the lens groups. This is because it is assumed that the mechanical lens moves with the lens groups which move for the zooming operation and the focusing operation. Furthermore, when each of the lens groups includes a plurality of lenses, the mechanical shutter may be located between lenses included in each of the lens groups.

Figure 3:
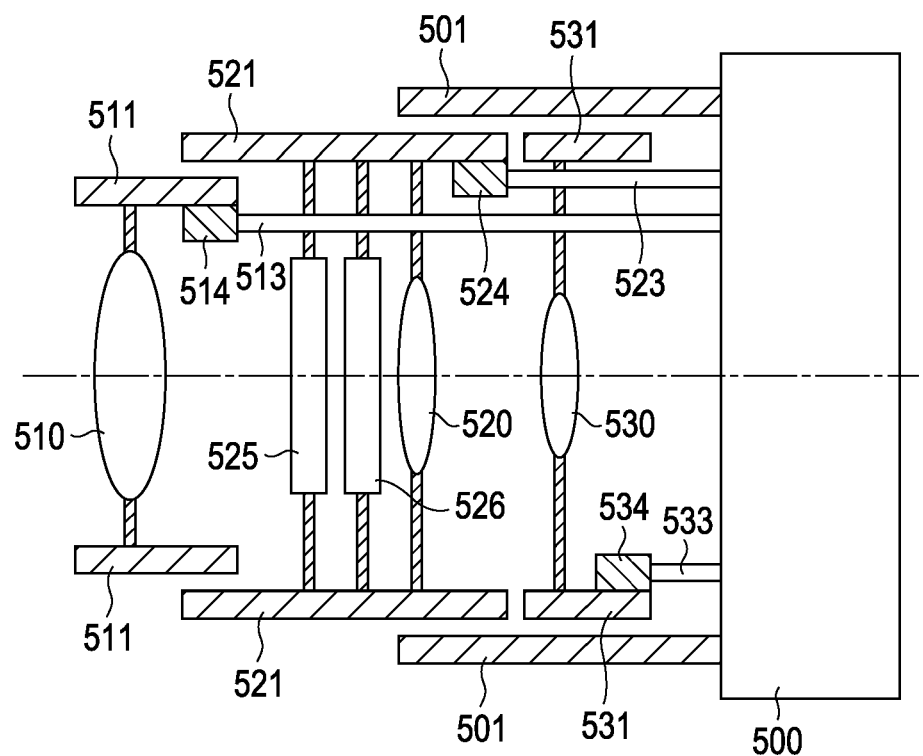
FIG. 3 is a sectional view illustrating the lens barrel.

In view of the consideration described above, the optical lens barrel 101 of this embodiment will be described. FIG. 3 is a sectional view illustrating the lens barrel 101. Note that a main body of an apparatus 500 is not described in detail here except for the optical lens barrel 101 included in the apparatus 500. As shown in FIG. 3, the optical lens barrel 101 includes a fixed lens barrel 501 which is fixed to the apparatus 500, a first lens group 510, a first lens barrel 511 in which the first lens group 510 is disposed, a second lens group 520, a second lens barrel 521 in which the second lens group 520 is disposed, a third lens group 530 including at least one lens, and a third lens barrel 531 in which the third lens group 530 is disposed. Furthermore, the second lens barrel 521 includes an aperture 525 (light-quantity controlling means) and a mechanical shutter 526 (light-shielding means).

Here, the first lens barrel 511 is movable in a direction of the optical axis relative to the second lens barrel 521. Furthermore, the second lens barrel 521 is movable in the direction of the optical axis relative to the fixed lens barrel 501. Moreover, the third lens barrel 531 is movable in the direction of the optical axis relative to the fixed lens barrel 501. For example, a spiral groove is formed inside the second lens barrel 521 and a guide pin for the groove is disposed on an outside of the first lens barrel 511.

Then, when the first lens barrel 511 is rotated by a driving conversion unit 514 which includes a drive shaft 513 extending from the main body of the apparatus 500 and a gear, the guide pin of the first lens barrel 511 moves along the groove formed inside the second lens barrel 521. As a result, the first lens barrel 511 moves in the direction of the optical axis relative to the second lens barrel 521. Similarly, when the second lens barrel 521 is driven by a driving conversion unit 524 which includes a drive shaft 523 extending from the main body of the apparatus 500 and a gear, the second lens barrel 521 moves in the direction of the optical axis relative to the fixed lens barrel 501. Furthermore, similarly, when the third lens barrel 531 is driven by a driving conversion unit 534 which includes a drive shaft 533 extending from the main body of the apparatus 500 and a gear, the third lens barrel 531 moves in the direction of the optical axis relative to the fixed lens barrel 501.

Here, even when control lines extending from the synchronization controller 106 are used instead of the drive shafts and motors are used instead of the driving conversion units as a method for rotating the first lens barrel 511, the second lens barrel 521, and the third lens barrel 531, similar operations can be performed. As described above, since the lens groups are movable, similarly to FIG. 2, the first and second lens groups 510 and 520 realize the zooming function and the third lens group 530 realizes the focusing function.

Figure 4:
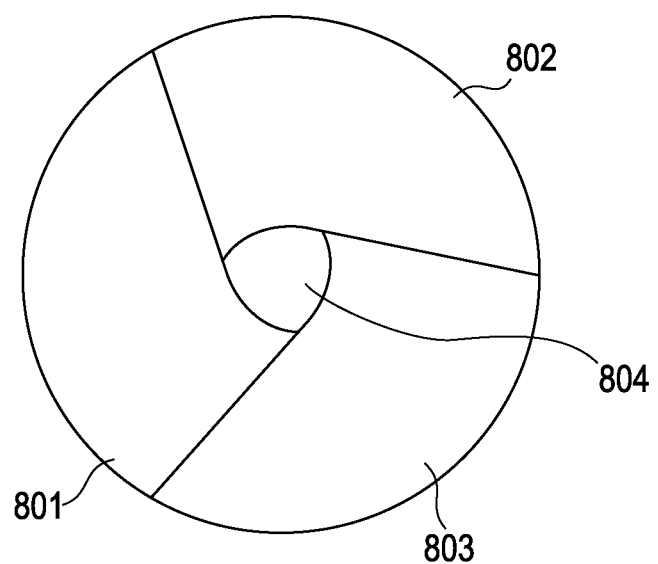
FIG. 4 is a diagram illustrating an aperture included in the optical lens barrel.

FIG. 4 is a diagram illustrating the aperture 525 shown in FIG. 3. The aperture 525 corresponds to an iris aperture configured such that aperture blades 801 to 803 are combined with one another and a diameter of an opening 804 is continually changed. Therefore, a light quantity is continually controlled. Although the opening 804 ideally has a circular shape, the opening 804 may have a number of corners corresponding to the number of employed aperture blades. Although a case where three aperture blades are used is described in this embodiment, an aperture having a reduced or increased number of aperture blades may be used where appropriate.

Figure 5:
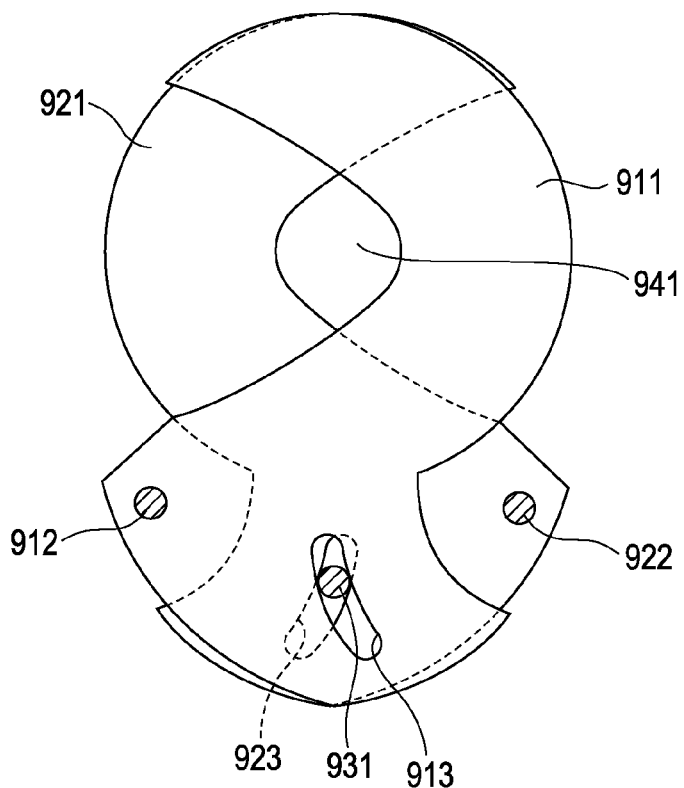
FIG. 5 is a diagram illustrating a mechanical shutter included in the optical lens barrel.

FIG. 5 is a diagram illustrating the mechanical shutter 526 shown in FIG. 3. The mechanical shutter 526 can block light incident on the image-forming plane using shutter blades 911 and 921. In FIG. 5, the shutter blades 911 and 921 can be rotated with rotation shafts 912 and 922 as axes, respectively. Furthermore, the shutter blades 911 and 921 have guide holes 913 and 923, respectively, and a drive pin 931 which is movable in a vertical direction is disposed so as to engage both of the guide holes. The lower the portions of the guide holes 913 and 923 are, the farther distances between the rotation shafts 912 and 922 and the guide holes 913 and 923 become, respectively. When the drive pin 931 is moved upward, an opening portion 941 is closed so as to block light whereas when the drive pin 931 is moved downward, the opening portion 941 is opened.

Figure 6:
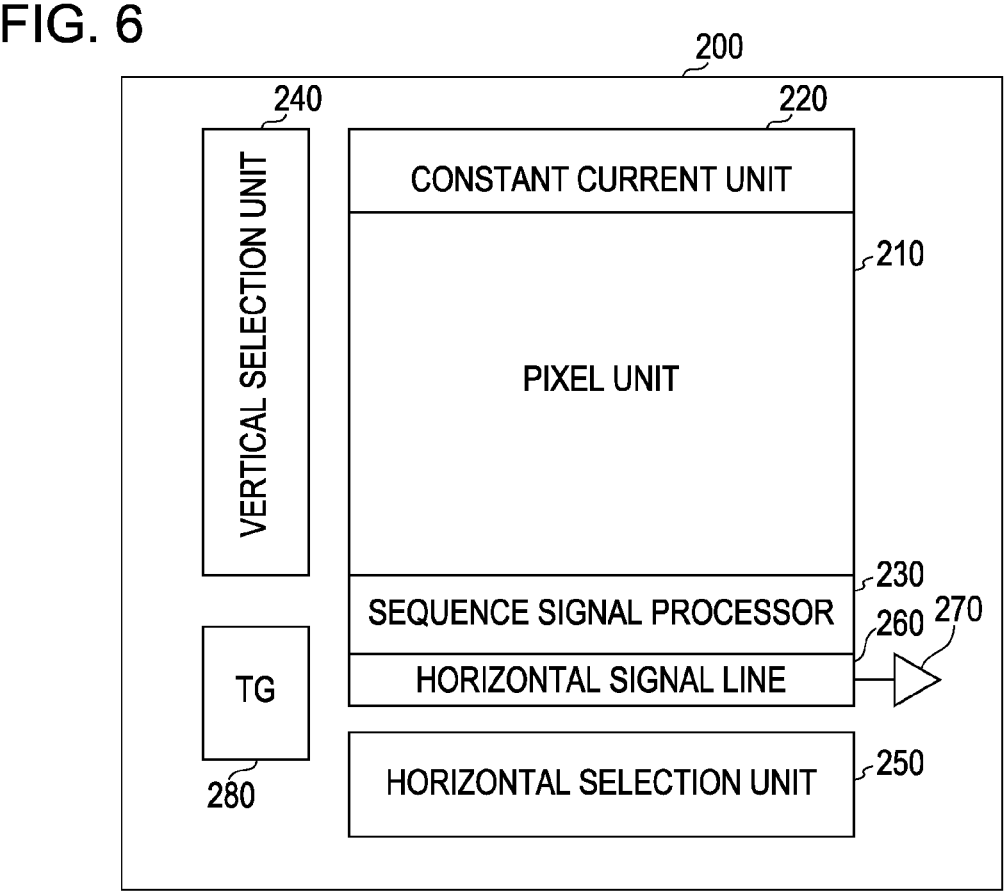
FIG. 6 is a diagram schematically illustrating configurations of an image pickup element and analog peripheral circuits.

FIG. 6 is a diagram schematically illustrating configurations of the image pickup element 102 and analog peripheral circuits. The image pickup element 102 (image sensor) of this embodiment includes a semiconductor substrate 200 including the following various components arranged thereon. That is, a pixel unit (image-pickup region) 210, a constant current unit 220, a sequence signal processor 230, a vertical selection unit 240, a horizontal selection unit 250, a horizontal signal line 260, an output processor 270, and a TG (Timing Generator) 280 are disposed. The pixel unit 210 includes a number of pixels arranged in a matrix, and each of the pixels includes a pixel circuit which will be described with reference to FIG. 7 hereinafter.

The pixel unit 210 outputs image signals to the sequence signal processor 230 through vertical signal lines for individual pixel columns, which will be described hereinafter. In the constant current unit 220, constant current sources are disposed for individual pixel columns in order to supply bias currents to the pixels. The vertical selection unit 240 selects the pixels of the pixel unit 210 on a row-by-row basis and controls driving of a resetting operation and a reading operation performed on the pixels. The sequence signal processor 230 receives signals of the pixels through the vertical signal lines on a row-by-row basis, performs a predetermined signal process on each of the rows, and temporarily stores the signals. For example, the CDS process, the AGC process, and the AD conversion process are appropriately performed.

The horizontal selection unit 250 selects each of the signals of the sequence signal processor 230 and supplies the signals to the horizontal signal line 260. The output processor 270 performs a predetermined process on the signals supplied from the horizontal signal line 260 and outputs the signals. The output processor 270 includes a gain control circuit and a color process circuit, for example. Note that the AD conversion may be performed by the output processor 270 instead of the sequence signal processor 230. The TG 280 outputs various types of pulse signal required for operating the various units under control of the synchronization controller 106.

Figure 7:
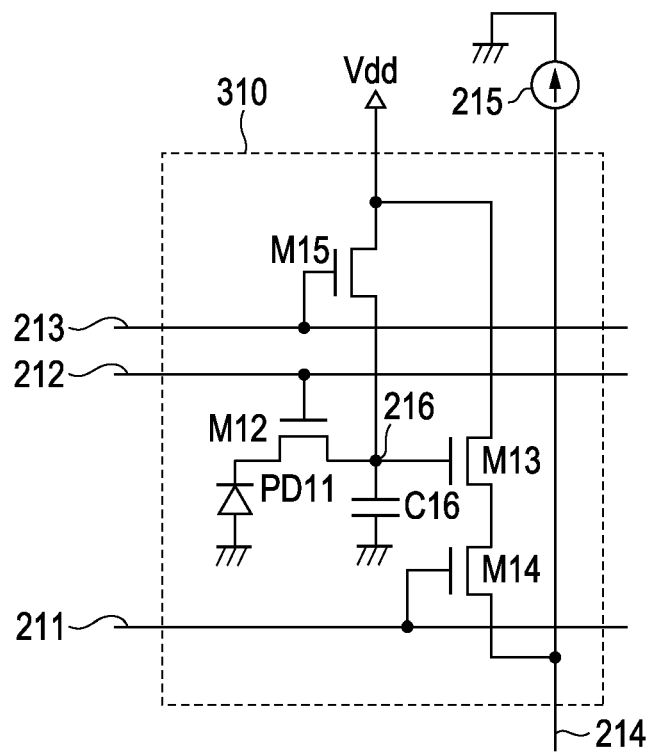
FIG. 7 is a diagram illustrating a configuration of a pixel circuit included in the image pickup element.

FIG. 7 is a diagram illustrating a circuit configuration of one of pixels 310 included in the pixel unit 210 of the image pickup element 102. As shown in FIG. 7, each of the pixels 310 includes a photodiode PD11, a transfer transistor M12, an amplification transistor M13, a selection transistor M14, and a reset transistor M15. Note that the transistors correspond to n-channel MOSFETs (MOS Field-Effect Transistors). Furthermore, a row selection signal line 211, a transfer signal line 212, and a reset signal line 213 are connected to the gate of the selection transistor M14, the gate of the transfer transistor M12, and the gate of the reset transistor M15, respectively. These signal lines extend in a horizontal direction and simultaneously drive pixels included in the same row. By this configuration, an operation of a line-sequential-operation rolling shutter and an operation of an all-row-simultaneous-operation global shutter can be controlled. Furthermore, a vertical signal line 214 is connected to the source of the selection transistor M14 one of end portions of the vertical signal line 214 is connected to the ground through a constant current source 215.

The photodiode PD11 (photoelectric conversion means) performs photoelectric conversion so as to generate a charge and stores the charge. The photodiode PD11 is grounded at a P side thereof and is connected to the source of the transfer transistor M12 at an N side thereof. When the transfer transistor M12 (transfer means) is turned on, the charge of the photodiode PD11 is transmitted to an FD 216 (storing means) for storage. The FD 216 has a parasitic capacitor C16 which stores the charge. The drain of the amplification transistor M13 has a power supply voltage Vdd and the gate of the amplification transistor M13 is connected to the FD 216. The amplification transistor M13 converts a voltage of the FD 216 into an electric signal.

The selection transistor M14 is used to select pixels from which signals are to be read for individual rows. The drain of the selection transistor M14 is connected to the source of the amplification transistor M13 and the source is connected to the vertical signal line 214. When the selection transistor M14 is turned on, the amplification transistor M13 and the constant current source 215 constitute a source follower, and therefore, a voltage corresponding to the voltage of the FD 216 is supplied to the vertical signal line 214. The drain of the reset transistor M15 has the power supply voltage Vdd and the source of the reset transistor M15 is connected to the FD 216. When the reset transistor M15 (reset means) is turned on, the voltage of the FD 216 is reset to the power supply voltage Vdd.

Hereinafter, an example of a basic operation of the pixel unit 210 will be described. In this circuit, two types of electronic shutter operation, i.e., a rolling shutter operation and a global shutter operation can be performed.

Control of Rolling Shutter Operation

In order to start control of the rolling shutter operation, the mechanical shutter 526 should be first placed in an open state. Thus, if it is found that the mechanical shutter 526 has been previously closed, the mechanical shutter 526 is activated so as to be opened. Then, a reset time is calculated using an exposure time to be set. When the calculated reset time has been reached, the reset signal line 213 is set to have a high potential for pixels included in a read-starting row of the pixel unit 210 so that the reset transistors M15 are turned on. Next, the transfer signal line 212 is set to have a high potential so that the transfer transistors M12 are turned on. By this, the FDs 216 and the photodiodes PD11 are reset. Then, the transfer signal line 212 is set to have a low potential so that the transfer transistors M12 are turned off. By this, exposure of the photodiodes PD11 is started. Next, the reset signal line 213 is set to have a low potential so that the reset transistors M15 are turned off.

Thereafter, immediately before the exposure is terminated, the reset signal line 213 of the starting row is set to have a high potential and the reset transistors M15 are turned on whereby the FDs 216 are set to have the power supply voltage Vdd. In this state, the row selection signal line 211 of the starting row is set to have a high potential and the selection transistors M14 are turned on, and thereafter, the reset signal line 213 is set to have a low potential whereby the reset transistors M15 are turned off. By this, reset voltages corresponding to the voltages of the FDs 216 are output to the vertical signal line 214.

Next, the transfer signal line 212 is set to have a high potential and the transfer transistors M12 are turned on whereby signal charges generated in the photodiodes PD11 is supplied to the FDs 216. Then, the transfer signal line 212 is set to have a low potential and the transfer transistors M12 are turned off whereby the exposure is terminated. Then, signal charge voltages which are proportional to voltages to which the signal charges supplied to the FDs 216 have been added are output to the vertical signal line 214. Here, signal voltages are obtained by subtracting the reset voltages from the signal charge voltages output to the vertical signal line 214, and the signal voltages are extracted by the CDS process performed on a corresponding column by the sequence signal processor 230, for example. Then, individual columns are successively selected by the horizontal selection unit 250 so that pixel signals for one row, that is, for the starting row are output.

Then, after the row selection signal line 211 of the starting row is set to have a low potential, the selection transistors M14 are turned off, and the calculated reset time has been reached, the reset transistors M15 and the transfer transistors M12 are turned on. Then, after the reset transistors M15 and the transfer transistors M12 are turned off, next exposure is started. The operation described above is performed on a row-by-row basis in a delayed manner starting from the starting row in synchronization with horizontal synchronization signals so that pixel signals of the individual rows are output. Accordingly, exposure times of the individual rows are shifted on a row-by-row basis.

Figure 8:
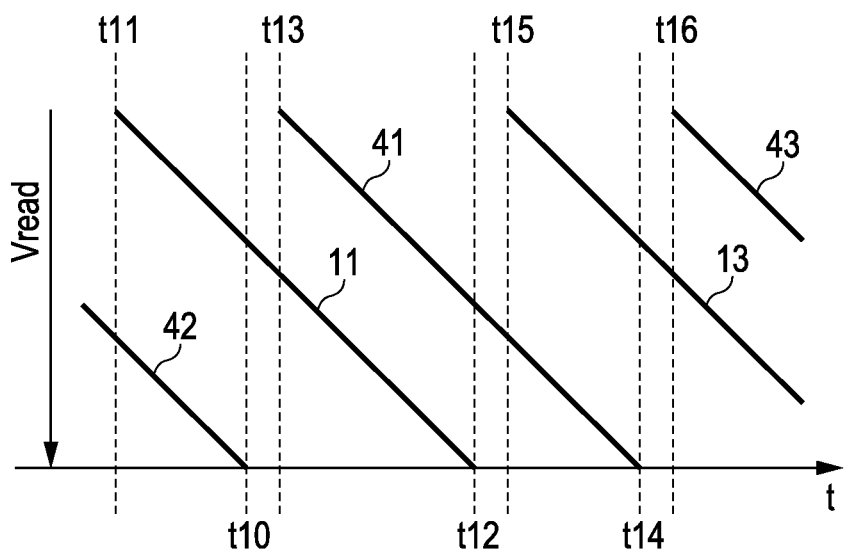
FIG. 8 is a diagram illustrating image-capturing timings in a rolling shutter operation.

FIG. 8 is a diagram illustrating image-capturing timings in this rolling shutter operation. The rolling shutter operation is used for image display at a time of monitoring and movie recording. As stated above, when is found that the mechanical shutter 526 has been closed, the mechanical shutter 526 is acted upon (moved) to be opened. Furthermore, an opening amount of the aperture 525 is set in advance in accordance with an image capturing condition.

In FIG. 8, a read starting row is located on an upper side, a read ending row is located on a lower side, and "Vread" represents a reading direction. First, in accordance with the exposure time to be set, a reset starting time t11 is calculated. Then, in a reset operation period from the timing t11 to a timing t12, the pixel reset operation described above is performed on a row-by-row basis from the read starting row to the read ending row (as denoted by a reference numeral 11 in FIG. 8).

Next, after the read starting row has been reset and an exposure period has been elapsed, at a timing t13, the pixel reading operation described above is started. Then, in an operation period from the timing t13 to a timing t14, pixel signals are output on a row-by-row basis starting from the read starting row to the read ending row (as denoted by a reference numeral 41 in FIG. 8).

Furthermore, a next reset operation period is started at a next reset starting time t15 (as denoted by a reference numeral 13 in FIG. 8), and a next read operation period is started at a next read starting time t16 (as denoted by a reference numeral 43 in FIG. 8). Note that a preceding read operation period is terminated at a timing t10 (as denoted by a reference numeral 42 in FIG. 8).

As described above, since synchronization control is performed while a period from the timing t13 to the timing t16 is determined as one cycle, the image display at a time of monitoring and the movie recording are realized.

Control of Global Shutter Operation

First, if the mechanical shutter 526 has been closed, the mechanical shutter 526 is opened. Next, a reset time is calculated in accordance with an exposure time to be set. When the calculated reset time has been reached, in all the rows of the pixel unit 210, the reset signal lines 213 are set to have high potentials and the reset transistors M15 are turned on, and thereafter, the transfer signal lines 212 are set to have high potentials and the transfer transistors M12 are turned on. In this manner, the FDs 216 and the photodiodes PD11 included in all the pixels (all the rows) are reset. Subsequently, in all the rows, the transfer signal lines 212 are set to have low potentials and the transfer transistors M12 are turned off whereby exposure of the photodiodes PD11 included in all the pixels is started. Next, the reset signal lines 213 of all the rows are set to have low potentials and the reset transistors M15 are turned off.

Thereafter, immediately before the exposure is terminated, the reset signal lines 213 of all the rows are set to have high potentials and the reset transistors M15 are turned on whereby the FDs 216 are set to have the power supply voltage Vdd. Next, the reset signal lines 213 of all the rows are set to have low potentials and the reset transistors M15 are turned off. Subsequently, the transfer signal lines 212 of all the rows are simultaneously set to have high potentials and the transfer transistors M12 are turned on whereby signal charges generated in the photodiodes PD11 of all the pixels are supplied to the FDs 216. Then, the transfer signal lines 212 of all the rows are set to have low potentials and the transfer transistors M12 are turned off whereby the exposure is terminated and the FDs 216 of all the pixels store the supplied signal charges. In this state, the mechanical shutter 526 (light-shielding means) is operated so that light to encounter all the pixels are blocked. Then, after the light shielding operation is terminated, the pixel reading operation is started.

First, for the pixels included in the read starting row of the pixel unit 210, the row selection signal line 211 is set to have a high potential and the selection transistors M14 are turned on whereby signal charge voltages which is proportional to voltages to which signal charges supplied to the FDs 216 are added are output to the vertical signal line 214. Next, the reset signal line 213 of the starting row is set to have a high potential and the reset transistors M15 are turned on whereby the FDs 216 are set to have the power supply voltage Vdd. In this state, the reset signal line 213 of the starting row is set to have a low potential and the reset transistors M15 are turned off whereby reset voltages corresponding to voltages of the FDs 216 at this time are supplied to the vertical signal line 214. Thereafter, the row selection signal line 211 of the starting row is set to have a low potential and the selection transistors M14 are turned off. Here, signal voltages are obtained by subtracting the reset voltages from the signal charge voltages output to the vertical signal line 214. The signal voltages are extracted by the CDS process performed on a corresponding column by the sequence signal processor 230, for example. Then, individual columns are successively selected by the horizontal selection unit 250 so that pixel signals for one row, that is, for the starting row are output.

The reading operation as described above is performed starting from the starting row on a row-by-row basis in a delayed manner in synchronization with horizontal synchronization signals so that the pixel signals of the individual rows are successively output. Accordingly, reading periods of the individual rows are shifted on a row-by-row basis.

Figure 9:
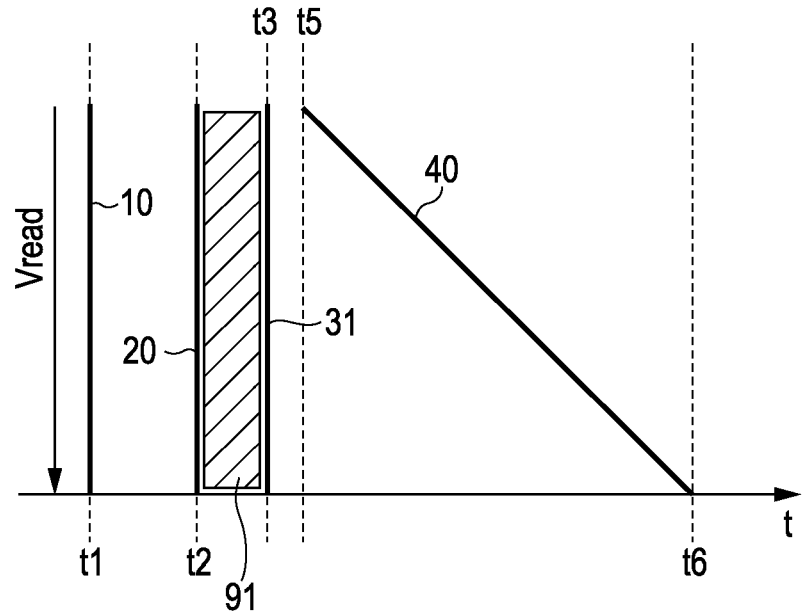
FIG. 9 is a diagram illustrating image-capturing timings in a global shutter operation.

FIG. 9 is a diagram illustrating timings in the global shutter operation. The global shutter operation is used for still-image recording. If the mechanical shutter 526 has been closed, the mechanical shutter 526 is opened. Furthermore, an opening amount of the aperture 525 is set in advance in accordance with an image-capturing condition.

In FIG. 9, a read starting row is located on an upper side, a read ending row is located on a lower side, and "Vread" represents a reading direction. First, in accordance with an exposure time to be set, a reset time t1 is calculated. Then, the all-row simultaneous reset operation described above is performed at the reset time t1 (as denoted by a reference numeral 10 in FIG. 9).

Next, after a set exposure period starting from the reset time t1 has been elapsed, at a timing t2, the all-row simultaneous transfer operation described above is performed (as denoted by reference numeral 20 in FIG. 9). Since leakage of light to the FDs 216 has been continued even after the all-row simultaneous transfer operation is performed, the mechanical shutter 526 performs a light-shielding operation at a timing t3 (as denoted by a reference numeral 31 in FIG. 9). A hatched portion 91 shown in FIG. 9 represents a state of the light leakage to all the pixels (all the rows) after the all-row simultaneous transfer operation is performed. Here, in the optical lens barrel 101 shown in FIG. 3, since the mechanical shutter 526 is located between the first lens group 510 and the second lens group 520 which are included in the zoom lens, light incident on all the pixels can be simultaneously blocked. Therefore, at the timing t3, the light leakage to all the pixels can be prevented.

Then, after the light shielding is completed, the pixel reading operation described above is started. In a reading operation period from a timing t5 to a timing t6, pixel signals are output from the read starting row to the read ending row on a row-by-row basis (as denoted by a reference numeral 40 in FIG. 9).

As described above, in this embodiment, by performing the global shutter operation including the all-row simultaneous reset operation and the all-row simultaneous transfer operation, a problem in which a moving object is captured in an inclined state can be solved. Furthermore, since the zoom lens includes the mechanical shutter, levels of the light leakage to all the pixels are equally suppressed, and accordingly, uneven light leakage is prevented. Although the mechanical shutter 526 is included in the second lens barrel 521, the mechanical shutter 526 may be included in the first lens barrel 511 corresponding to the position P22 shown in FIG. 2 as long as the mechanical shutter 526 is located between the first lens group 510 and the second lens group 520.

Note that in a case where a still image is to be captured, when an exposure time is comparatively long, for example, 0.1 second or more and when a moving object is captured, the image is blurred. In this case, even when an electronic shutter operation employing the rolling shutter method is performed, influence of distortion of the captured image caused by the electronic shutter operation to image quality is negligible. Therefore, only when the shutter release button is pressed and the exposure time calculated by the signal processor 104 or the synchronization controller 106 is smaller than a certain value, the global shutter operation and the mechanical shutter may be used in combination as shown in FIG. 9 for controlling image capturing. Furthermore, in other cases, the image capturing control may be performed using the rolling shutter operation as shown in FIG. 8. By this, an unnecessary operation of the mechanical shutter is suppressed and power consumption can be reduced.

Figure 10:
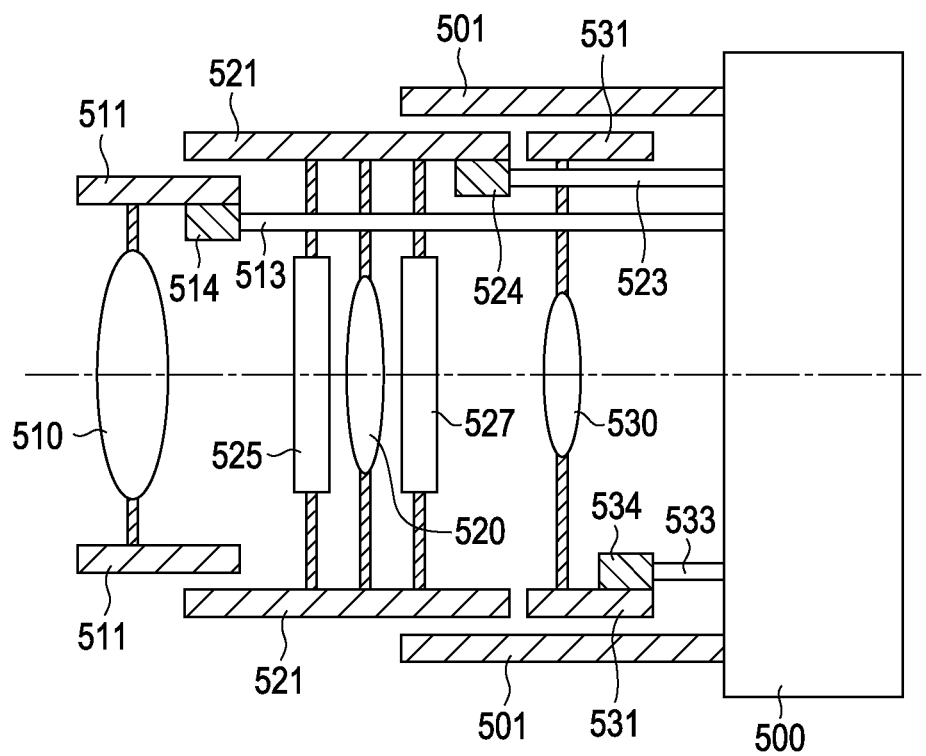
FIG. 10 is a sectional view illustrating an optical lens barrel of a modification.

Next, a modification of this embodiment will be described. FIG. 10 is a modification of the optical lens barrel 101 of this embodiment. A configuration of a second lens barrel 521 is different from that shown in FIG. 3 and other configurations are the same as those shown in FIG. 3. In FIG. 10, a mechanical shutter 527 is located between a second lens group 520 and a third lens group 530. That is, the mechanical shutter 527 is located on an opposite side of a first lens group 510 relative to the second lens group 520.

Here, the mechanical shutter 527 is located in the position P24 shown in FIG. 2. According to the consideration made with reference to FIG. 2, in this position, a difference between an exposure time of an outer portion and an exposure time of a center portion is generated, although the difference is smaller than that in the position P27.

However, in this embodiment, a light-shielding operation 31 of the mechanical shutter is performed after an all-row simultaneous transfer operation 20 included in a global shutter operation is completed. Therefore, the light-shielding operation 31 is not performed for light shielding for an object but light shielding for light leakage. Therefore, since unevenness of exposure of an object image is not generated but unevenness of light leakage is slightly generated, influence to the image is negligible. Furthermore, although the mechanical shutter 527 is included in the second lens barrel 521 in FIG. 10, the mechanical shutter 527 may be included in a third lens barrel 531 corresponding to the position P25 shown in FIG. 2 since the mechanical shutter is merely used for the light shielding for light leakage which is smaller than light shielding for the exposure.

Figure 11:
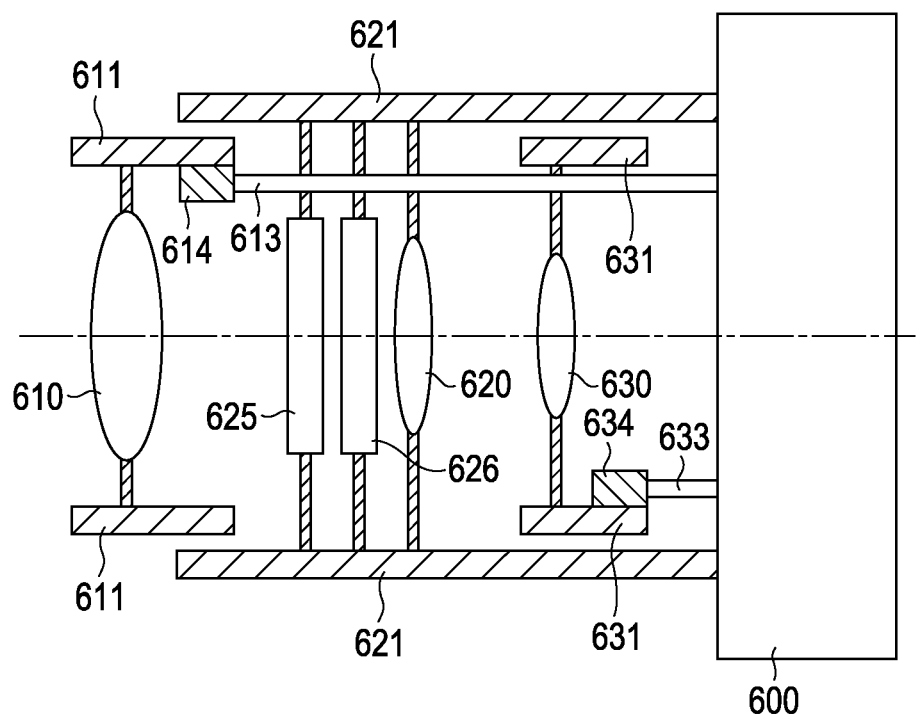
FIG. 11 is a sectional view illustrating an optical lens barrel of another modification.

FIG. 11 is another modification of the optical lens barrel 101 of this embodiment. As shown in FIG. 11, the optical lens barrel 101 is disposed on a main body of an image pickup apparatus 600 and includes a first lens barrel 611 including a first lens group 610, a second lens barrel 621 including a second lens group 620, and a third lens barrel 631 including a third lens group 630. The second lens barrel 621 is fixed to the image pickup apparatus 600.

Furthermore, the second lens barrel 621 includes an aperture 625 serving as light-quantity control means and a mechanical shutter 626 serving as light-shielding means. Here, the first lens barrel 611 can be moved in a direction of an optical axis relative to the second lens barrel 621 by a driving conversion unit 614 which includes a drive shaft 613 and a gear.

The optical lens barrel 101 shown in FIG. 11 is configured as a single focus lens having a collapsible structure. When the image pickup apparatus is not powered, the first lens barrel 611 is accommodated in the second lens barrel 621 so that a thickness of the entire image pickup apparatus is reduced.

In operation of the image pickup apparatus, the first lens barrel 611 is projected from the second lens barrel 621, the first lens group 610 and the second lens group 620 constitute an image-forming lens, and the third lens group 630 serves as a focus lens. Also in the optical lens barrel 101 shown in FIG. 11, since the mechanical shutter 626 is positioned in a pupil plane which is located between the first lens group 610 and the second lens group 620, unevenness of light leakage can be prevented. Furthermore, the mechanical shutter 626 may be included in the first lens barrel 611 corresponding to the position P22 shown in FIG. 2. Moreover, taking the mechanical shutter 626 used for blocking leakage light into consideration, the mechanical shutter 626 may be included in the second lens barrel 621 corresponding to the position P24 shown in FIG. 2 or may be included in the third lens barrel 631 corresponding to the position P25 shown in FIG. 2.

Figure 12:
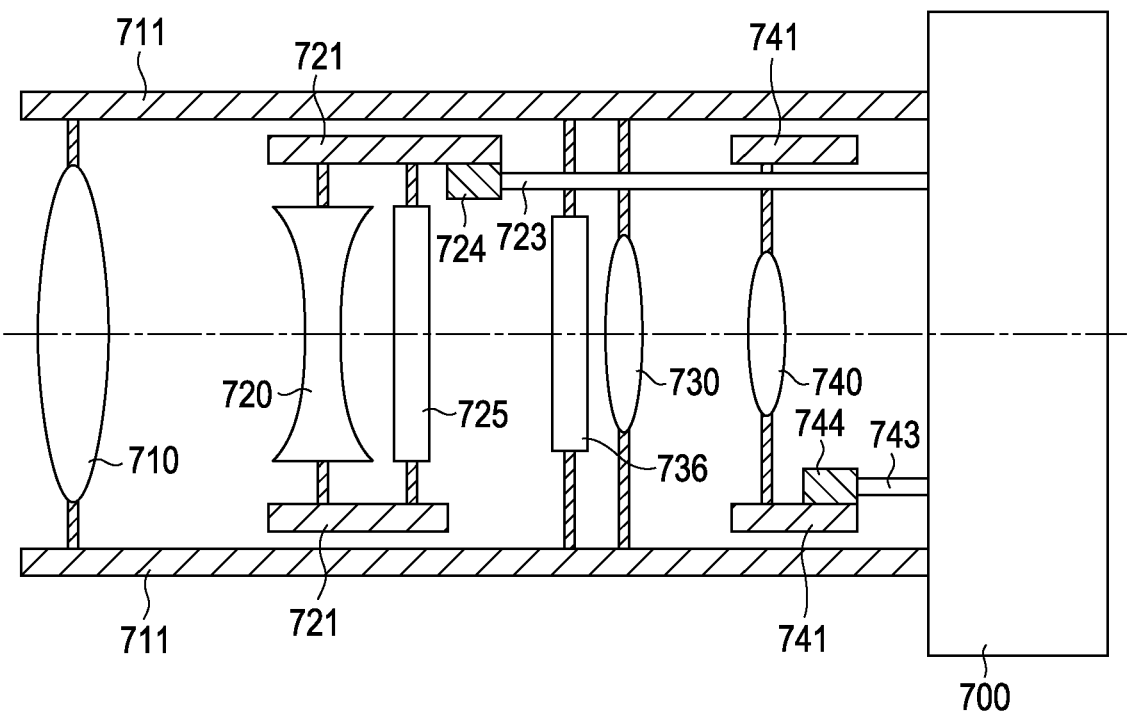
FIG. 12 is a sectional view illustrating an optical lens barrel of a further modification.

FIG. 12 is a diagram illustrating a further modification of the optical lens barrel 101 of this embodiment. As shown in FIG. 12, the optical lens barrel 101 includes a first lens barrel 711, a second lens barrel 721, and a third lens barrel 741. The first lens barrel 711 includes a first lens group 710 and a third lens group 730, the second lens barrel 721 includes a second lens group 720, and the third lens barrel 741 includes a fourth lens group 740. The first lens barrel 711 is fixed to a main body of an image pickup apparatus 700.

Furthermore, the second lens barrel 721 includes an aperture 725 serving as light-quantity control means, and the first lens barrel 711 includes a mechanical shutter 736 serving as light-shielding means. Note that the mechanical shutter 736 is located between the second lens group 720 included in the second lens barrel 721 and the third lens group 730 included in the first lens barrel 711. Here, the second lens barrel 721 can be moved in a direction of an optical axis relative to the first lens barrel 711 by a driving conversion unit 724 including a drive shaft 723 and a gear. Furthermore, the third lens barrel 741 can be moved in the direction of the optical axis relative to the first lens barrel 711 by a driving conversion unit 744 including a drive shaft 743 and a gear.

The optical lens barrel 101 shown in FIG. 12 is configured so as to be used as a zoom lens including four groups. The first lens group 710, the second lens group 720, and the third lens group 730 constitute the zoom lens and the fourth lens group 740 corresponds to a focus lens. Note that the second lens group 720 which functions as a magnification lens is constituted by a concave lens. Also in the optical lens barrel 101 shown in FIG. 12, since the mechanical shutter 736 is located in a pupil plane positioned between the second lens group 720 and the third lens group 730, unevenness of light leakage can be prevented.

Moreover, the mechanical shutter 736 may be located between the first lens group 710 and the second lens group 720 in the first lens barrel 711 or the second lens barrel 721. Alternatively, the mechanical shutter 736 may be located between the second lens group 720 and the third lens group 730 in the second lens barrel 721 or the first lens barrel 711. In addition, taking the mechanical shutter 736 used for blocking leakage light into consideration, the mechanical shutter 736 may be located between the third lens group 730 and the fourth lens group 740 in the first lens barrel 711 or the third lens barrel 741.

Second Embodiment

Figure 13:
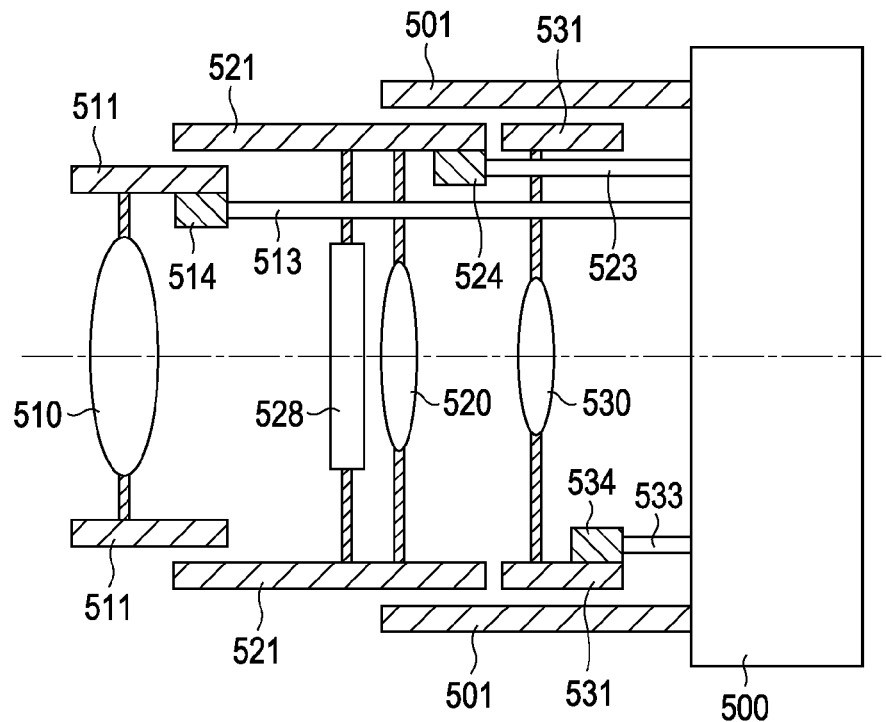
FIG. 13 is a sectional view illustrating an optical lens barrel of a still further modification.

Referring now to FIG. 13 in addition to FIGS. 1 to 9 and FIGS. 11 and 12, an image pickup apparatus according to a second embodiment of the present invention will be described. Note that, in this embodiment, a basic configuration and basic operations of the image pickup apparatus and a basic configuration and basic operations of an image pickup element are the same as those of the first embodiment, and therefore, a description will be made using the same drawings and the same reference numerals. FIG. 13 is a diagram illustrating an optical lens barrel 101 of this embodiment. Here, a configuration of the optical lens barrel 101 is the same as that shown in FIG. 3 except that a second lens barrel 521 includes an aperture shutter 528.

Next, a method for realizing the aperture shutter 528 will be described with reference to FIG. 4. In FIG. 4, an iris aperture is configured by combining three aperture blades 801, 802, and 803 with one another. An elastic member such as a spring may be disposed in a direction in which the aperture blades are closed and a motion in an opening direction is controlled by a motor, for example, whereby the aperture blades have a function of being closed at high speed in conjunction with a shutter operation. Alternatively, one of the aperture blades may have a function of being independently closed at high speed.

Furthermore, another method for realizing the aperture shutter 528 will be described with reference to FIG. 5. In FIG. 5, shutter blades 911 and 921 constitute a mechanical shutter. An opening portion 941 can function as an opening of an aperture by controlling a drive pin 931 to stop in not only an opening position and a closing position but also positions between the opening and closing positions. That is, a function of controlling quantity of light which is incident on an image pickup element is provided.

It is apparent that even when the aperture shutter 528 described with reference to FIGS. 4 and 5 is employed in the optical lens barrel 101 shown in FIG. 13, the global shutter operation described with reference to FIGS. 7 and 9 can be performed.

As described above, in this embodiment, a problem in which a moving object is captured in a tilted state is solved by the global shutter operation including an all-row simultaneous reset operation and an all-row simultaneous transfer operation. In addition, since the aperture shutter is included in the zoom lens, levels of light leakage to all pixels can be equally suppressed, and accordingly, unevenness of light leakage can be prevented.

Furthermore, in the first embodiment, as shown in FIG. 3, since both of the aperture 525 and the mechanical shutter 526 are arranged between the first lens group 510 and the second lens group 520, moving ranges of the first lens group 510 and the second lens group 520 are limited. On the other hand, in this embodiment, since the aperture and the mechanical shutter are integrally formed, the problem in which the moving ranges of the lens groups are limited can be solved, and in addition, miniaturization and simplification of the image pickup apparatus can be attained.

Moreover, although the aperture shutter 528 of this embodiment is included in the second lens barrel 521, the aperture shutter 528 may be included in the first lens barrel 511 corresponding to the position P22 shown in FIG. 2 as long as the aperture shutter 528 is located between the first lens group 510 and the second lens group 520. Furthermore, the aperture shutter 528 of this embodiment may be applicable to FIGS. 3, 11, and 12.

Third Embodiment

Next, referring to FIG. 14 in addition to FIGS. 1 to 13, an image pickup apparatus according to a third embodiment of the present invention will be described. Note that, in this embodiment, a basic configuration and basic operations of the image pickup apparatus and a basic configuration and basic operations of an image pickup element are the same as those of the first and second embodiments, and therefore, the same drawings and the same reference numerals are used for descriptions thereof.

Figure 14:
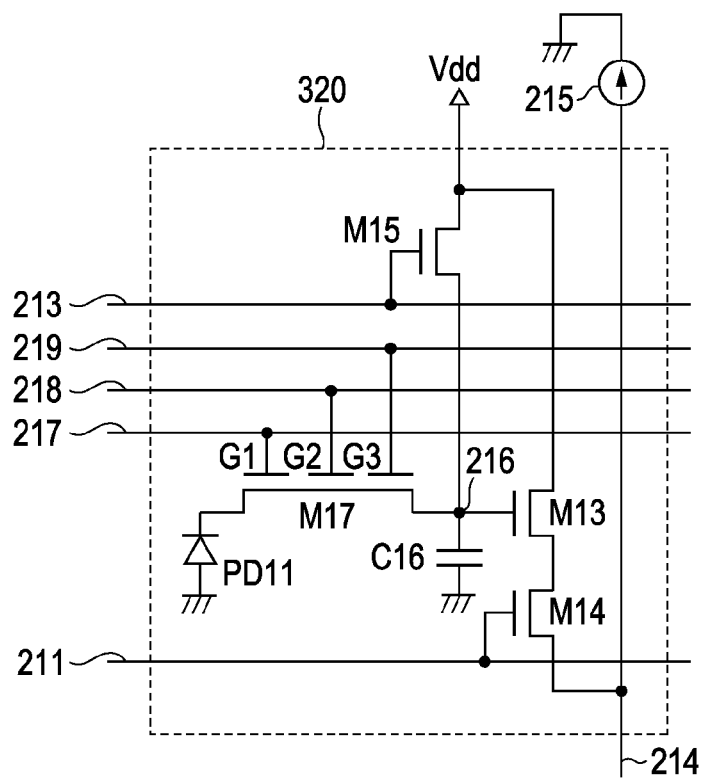
FIG. 14 is a diagram illustrating a configuration of a pixel circuit included in an image pickup element.

FIG. 14 is a diagram illustrating a circuit configuration of one of pixels 320 arranged in a pixel unit 210 shown in FIG. 6 according to this embodiment. The configuration is the same as that shown in FIG. 7 except that a charge transfer element M17, a pixel transfer signal line 217 which performs transfer control of the charge transfer element M17, a pixel storage signal line 218, and an FD transfer signal line 219 are provided instead of the transfer transistor M12 and the transfer signal line 212.

Next, operation of the charge transfer element M17 will be described. The charge transfer element M17 includes transfer gates G1, G2, and G3, and the transfer gates G1, G2, and G3 controls storage states and barrier states (non-storage states) of corresponding transfer channels. An example of such a charge transfer element includes a CCD sensor. Under control of the transfer gates G1, G2, and G3, when the pixel transfer signal line 217, the pixel storage signal line 218, the FD transfer signal line 219 are in high potential states, charge storage states corresponding to a state in which a transistor is turned on are entered. Furthermore, when they are in low potential states, barrier states (non-storage states) corresponding to a state in which the transistor is turned off are entered.

Then, when transfer channels corresponding to the transfer gates G1, G2, and G3 enter the storage state or the barrier state (non-storage state) in a predetermined order, signal charges can be transmitted from a photodiode PD11 to an FD 216. Furthermore, the transfer channels corresponding to the transfer gates G1 and G3 are brought to the barrier states (non-storage state) and the transfer channel of the transfer gate G2 is brought to the storage state whereby the transfer channel of the transfer gate G2 can independently store the charge.

Here, image capturing timings in a case where a rolling shutter operation is performed using the pixels 320 shown in FIG. 14 will be described with reference to FIG. 8. First, a reset starting time t11 is calculated on the basis of an exposure time to be set.

Then, in a reset operation period from the timing t11 to a timing t12, a pixel reset operation is performed on a row-by-row basis from a read starting row to a read ending row of a pixel unit 210 (as denoted by a reference numeral 11 in FIG. 8). The pixel reset operation on a row-by-row basis is performed as follows. First, the reset signal line 213 is set to have a high potential and the reset transistors M15 are turned on. Thereafter, the pixel transfer signal line 217, the pixel storage signal line 218, and the FD transfer signal line 219 are set to have high potentials and all the transfer channels of the charge transfer element M17 are brought to the storage states. Since all the transfer channels of the charge transfer elements M17 are on states, charges of the photodiodes PD11 are transferred to the FDs 216 and the photodiodes PD11 are reset.

Subsequently, the pixel transfer signal line 217, the pixel storage signal line 218, and the FD transfer signal line 219 are set to have low potentials in this order and the transfer channels of the charge transfer elements M17 are brought to the barrier states (non-storage states). In this manner, exposure of the photodiodes PD11 is started. Note that the pixel transfer signal line 217, the pixel storage signal line 218, and the FD transfer signal line 219 are set to have low potentials in this order in order to reliably transmit the charges which remain in the transfer channels of the charge transfer elements M17 to the FDs 216. Finally, the reset signal line 213 is set to have a low potential, and the reset transistors M15 are turned off. The reset operation of the pixels is performed as described above.

Next, after the read starting row has been reset and an exposure period has been elapsed, at a timing t13, a pixel reading operation is started. Then, in an operation period from the timing t13 to a timing t14, pixel signals are output on a row-by-row basis starting from the read starting row to the read ending row of the pixel unit 210 (as denoted by a reference numeral 41 in FIG. 8). The pixel reading operation on a row-by-row basis is performed as follows. First, immediately before the exposure is terminated, the reset signal line 213 is set to have a high potential and the reset transistors M15 are turned on whereby the FDs 216 are set to have a power supply voltage Vdd. In this state, the row selection signal line 211 is set to have a high potential, the selection transistors M14 are turned on, the reset signal line 213 is set to have a low potential, and thereafter, the reset transistors M15 are turned off whereby reset voltages corresponding to voltages of the FDs 216 at this time are output to the vertical signal line 214.

Next, the pixel transfer signal line 217, the pixel storage signal line 218, and the FD transfer signal line 219 are set to have high potentials and the transfer channels of the charge transfer elements M17 are brought to the storage states whereby signal charges generated in the photodiodes PD11 are transmitted to the FDs 216. Subsequently, the pixel transfer signal line 217, the pixel storage signal line 218, and the FD transfer signal line 219 are set to have low potentials in this order and the transfer channels of the charge transfer elements M17 are brought to the barrier states (non-storage states). Accordingly, the exposure is terminated and signal charge voltages proportional to voltages to which the signal charges transmitted to the FDs 216 are added are output to the vertical signal line 214.

Here, signal voltages are obtained by subtracting reset voltages from the signal charge voltages output to the vertical signal line 214, and the signal voltages are extracted by a CDS process performed by a sequence signal processor 230 on a corresponding column, for example. Then, individual columns are successively selected by a horizontal selection unit 250 and pixel signals for one row are output. Finally, the row selection signal line 211 is set to have a low potential and the selection transistors M14 are turned off. The pixel reading operation is performed as described above.

Furthermore, a next reset operation period is started at a next reset starting time t15 (as denoted by a reference numeral 13 in FIG. 8) and a next read operation period is started at a next read starting time t16 (as denoted by a reference numeral 43 in FIG. 8). Note that a period until a timing t10 corresponds to a preceding read operation period (as denoted by a reference numeral 42 in FIG. 8). As described above, since synchronization control is performed while a period from the timing t13 to the timing t16 is determined as one cycle, image display at a time of monitoring and movie recording are realized.

Next, image capturing timings in a case where a global shutter operation is performed using the pixels 320 shown in FIG. 14 will be described with reference to FIG. 9. First, a reset time t1 is calculated on the basis of an exposure time to be set. Then, an all-row simultaneous reset operation is performed at the reset time t1 (as denoted by a reference numeral 10 in FIG. 9). The all-row simultaneous reset operation is executed as follows. First, the reset signal lines 213 of all rows are set to have high potentials and the reset transistors M15 are turned on. Subsequently, the pixel transfer signal lines 217 of all the rows, the pixel storage signal lines 218 of all the rows, and the FD transfer signal lines 219 of all the rows are set to have high potentials, and the transfer channels of the charge transfer elements M17 are brought to storage states. Since the transfer channels of the charge transfer elements M17 have been on states, the charges of the photodiodes PD11 are transmitted to the FDs 216 and the photodiodes PD11 of all pixels are reset.

Subsequently, the pixel transfer signal lines 217 of all the rows, the pixel storage signal lines 218 of all the rows, and the FD transfer signal lines 219 of all the rows are set to have low potentials in this order and the transfer channels of the charge transfer elements M17 are brought to barrier states (non-storage states). Accordingly, exposure of the photodiodes PD11 is started. The pixel transfer signal lines 217, the pixel storage signal lines 218, and the FD transfer signal lines 219 are set to have low potentials in this order in order to reliably supply the charges which remain in the transfer channels of the charge transfer elements M17 to the FDs 216. Finally, the reset signal lines 213 are set to have low potentials and the reset transistors M15 are turned off. The all-row simultaneous reset operation is performed as described above.

After an exposure period starting from the reset time t1 has been elapsed, at a timing t2, the all-row simultaneous transfer operation is performed (as denoted by reference numeral 20 in FIG. 9). First, the pixel transfer signal lines 217 of all the rows and the pixel storage signal lines 218 of all the rows are set to have high potentials and the transfer channels corresponding to the transfer gates G1 and G2 of the charge transfer elements M17 are brought to storage states. Here, the FD transfer signal lines 219 still have low potentials, and therefore, the transfer channels corresponding to the transfer gates G3 are in barrier states (non-storage states). Accordingly, signal charges generated in the photodiodes PD11 of all the pixels are supplied to the transfer channel corresponding to the gates G1 and G2.

Next, the pixel transfer signal lines 217 of all the rows are set to have low potentials whereby the transfer channels corresponding to the transfer gates G1 of the charge transfer elements M17 are brought to barrier states (non-storage states). By this, the exposure is terminated and the signal charges stored in the transfer channels corresponding to the transfer gates G1 are supplied to the transfer channels corresponding to the transfer gates G2 and the signal charges generated in the photodiodes PD11 of all the pixels are stored in the transfer channels corresponding to the transfer gates G2 of all the pixels. The all-row simultaneous transfer operation is performed as described above.

Even after the all-row simultaneous transfer operation is performed, light is continued to be leaked to the FDs 216. Therefore, at the timing t3, the mechanical shutter 526 performs a light-shielding operation (as denoted by a reference numeral 31 in FIG. 9). A hatched portion 91 shown in FIG. 9 represents a state of the leakage of light to all the pixels (all the rows) after the all-row simultaneous transfer operation is performed. Here, in the optical lens barrel 101 shown in FIG. 3, since the mechanical shutter 526 is located between a first lens group 510 and a second lens group 520 which are included in a zoom lens, the light incident on all the pixels can be simultaneously blocked. Therefore, at the timing t3, the leakage of light to all the pixels can be prevented.

Then, after the light shielding is completed, a pixel reading operation is started. In a reading operation period from a timing t5 to a timing t6, pixel signals are output from the read starting row to the read ending row on a row-by-row basis (as denoted by a reference numeral 40 in FIG. 9). The pixel reading operation on a row-by-row basis is performed as follows. First, the reset signal lines 213 are set to have high potentials and the reset transistors M15 are turned on whereby the FDs 216 are set to a power supply voltage Vdd. In this state, the row selection signal lines 211 are set to have high potentials and the selection transistors M14 are turned on. Thereafter, the reset signal lines 213 are set to have low potentials and the reset transistor M15 are turned off. By this, reset voltages corresponding to voltages of the FDs 216 at this time are output to the vertical signal lines 214.

Next, the FD transfer signal lines 219 are set to have high potentials and the transfer channels corresponding to the transfer gates G3 of the charge transfer elements M17 are brought to the storage states whereby the signal charges stored in the transfer channels corresponding to the transfer gates G2 are supplied to the FDs 216. Subsequently, the pixel storage signal lines 218 and the FD transfer signal lines 219 are set to have lower potentials in this order so that all the transfer channels of the charge transfer elements M17 are brought to barrier states (non-storage states). By this, signal charge voltages proportional to voltages to which the signal charges transmitted to the FDs 216 are output to the vertical signal lines 214.

Here, signal voltages are obtained by subtracting the reset voltages from the signal charge voltages output to the vertical signal line 214. The signal voltages are extracted by the CDS process performed by the sequence signal processor 230 on a corresponding column, for example. Then, individual columns are successively selected by the horizontal selection unit 250, and pixel signals for one row are output. Finally, the row selection signal lines 211 are set to have low potentials and the selection transistors M14 are turned off.

The pixel reading operation is performed as described above.

As described above, in this embodiment, a problem in which a moving object is captured in a tilted state is solved by the global shutter operation including the all-row simultaneous reset operation and the all-row simultaneous transfer operation. In addition, since the aperture shutter is included in the zoom lens, levels of leakage light to all pixels can be equally suppressed, and accordingly, unevenness of light leakage can be prevented.

Furthermore, in the first embodiment, an order of reading of the reset voltages and the signal charge voltages from the pixels 310 shown in FIG. 7 performed in the global shutter operation is different from that performed in the rolling shutter operation. In the rolling shutter operation, when the pixels are to be read, the reset voltages are output to the vertical signal lines 214 while the signal charge voltages to which the signal charges are added are output to the vertical signal lines 214. Accordingly, the reset voltages obtained when the signal charge voltages are read can be subtracted. However, when the reading from the pixels 310 is performed in the global shutter operation of the first embodiment, after the signal charge voltages are output to the vertical signal lines 214, the FDs 216 are reset and the reset voltages are supplied to the vertical signal lines 214. Therefore, voltages which are different from the reset voltages obtained before the signal charge voltages are read may be obtained due to influence of noise of the power supply voltage Vdd at a time of reset. In this case, noise is included in the signal voltages obtained by subtracting the reset voltages from the signal charge voltages.

Accordingly, in this embodiment, the charge transfer elements which can temporarily store the signal charges are disposed between the photodiodes and the FDs of the pixels 320. By this, the order of reading of the reset voltages and the signal charge voltages in the global shutter operation may be the same as that in the rolling shutter operation. Accordingly, reliable signal voltages can be obtained when the reset signals are subtracted from the signal charge voltages. Furthermore, the pixels including the charge transfer elements of this embodiment can be apparently employed in not only the optical lens barrels shown in FIG. 3 but also the optical lens barrels shown in FIGS. 10 to 13.

According to the present invention, an all-row simultaneous reset operation and an all-row simultaneous transfer operation are performed on the image pickup element so that exposure periods of all the rows coincide with one another, and thereafter, the light-shielding means included in the optical lens barrel is operated so as to block leakage light to be incident on the pixel circuits. By this, distortion of a captured image is prevented from being generated and generation of a difference between amounts of light leakage can be avoided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/069456, filed Nov. 16, 2009, which is hereby incorporated by reference herein in its entirety.

REFERENCE SIGNS LIST

101 OPTICAL LENS BARREL
102 IMAGE PICKUP ELEMENT
106 SYNCHRONIZATION CONTROLLER
510 FIRST LENS GROUP
520 SECOND LENS GROUP
525 APERTURE
526 MECHANICAL SHUTTER

The invention claimed is:
1. An image pickup apparatus comprising:
an image pickup element including a matrix of pixels, each of the pixels including a photoelectric converter which generates a charge in accordance with a quantity of incident light through photoelectric conversion,
a storage unit which stores the charge generated by the photoelectric converter,
a transfer unit which transfers the charge from the photoelectric converter to the storage unit, and
a reset unit which resets the storage unit;
an optical lens barrel configured to form an object image on the image pickup element and which includes
a first lens unit having at least one lens,
a second lens unit which includes at least one lens having an optical axis the same as that of the first lens unit and which is located between the first lens unit and the image pickup element,
a light-shielding unit which is located in the vicinity of the second lens unit and which blocks light to be incident on the image pickup element; and
a control unit for performing control such that
the photoelectric converter starts the photoelectric conversion by turning off the transfer unit after the photoelectric converter and the storage unit included in all rows of the image pickup element are simultaneously reset by turning on the reset unit and the transfer unit included in all the rows,
the light-shielding unit is operated after the photoelectric converter transmits the charge to the storage unit by simultaneously turning on the transfer unit in all the rows after a set exposure time has elapsed so as to block light to be incident on the photoelectric converter, and
voltages corresponding to charges stored in the storage unit are successively read on a row-by-row basis.

2. The image pickup apparatus according to claim 1, wherein the light-shielding unit is disposed between the first and second lens units.

3. The image pickup apparatus according to claim 1, wherein the light-shielding unit is located on an opposite side of the first lens unit relative to the second lens unit.

4. The image pickup apparatus according to claim 1, further comprising a light-quantity control unit which controls a quantity of light incident on the image pickup element.

5. The image pickup apparatus according to claim 1, wherein the light-shielding unit has a function of controlling a quantity of light incident on the image pickup element.

6. A method for controlling an image pickup apparatus comprising:
an image pickup element including
a plurality of pixels arranged in a matrix, each of the pixels including a photoelectric converter which generates a charge in accordance with a quantity of incident light through photoelectric conversion,
a storage unit which stores the charge generated by the photoelectric converter,
a transfer unit which transfers the charge from the photoelectric converter unit to the storage unit, and
a reset unit which resets the storage unit; and
an optical lens barrel which is used to form an object image on the image pickup element and which includes
a first lens unit having at least one lens,
a second lens unit which includes at least one lens having an optical axis the same as that of the first lens unit and which is located between the first lens unit and the image pickup element, and
a light-shielding unit which is located in the vicinity of the second lens unit and which blocks light to be incident on the image pickup element,
the method comprising:
simultaneously resetting the photoelectric coverter and the storage unit included in all rows of the image pickup element by turning on the reset unit and the transfer unit included in all the rows;
starting the photoelectric conversion by turning off the transfer unit after the photoelectric converter and the storage unit are simultaneously reset;
operating the light-shielding unit after the photoelectric converter transmits the charge to the storage unit by simultaneously turning on the transfer unit in all the rows after a set exposure time has elapsed so as to block light to be incident on the photoelectric converter; and
successively reading voltages corresponding to charges stored in the storage unit on a row-by-row basis.

* * * * *